United States Patent Office 3,269,989
Patented August 30, 1966

3,269,989
INTUMESCENT COATINGS BASED UPON POLY-
ESTERS OF ALIPHATIC DIYNE-DIOLS
Eric T. Rayner, David A. Yeadon, Lucien L. Hopper, Jr.,
Harold P. Dupuy, and Frank G. Dollear, all of New
Orleans, La., assignors to the United States of America
as represented by the Secretary of Agriculture
No Drawing. Filed Mar. 14, 1962, Ser. No. 179,818
17 Claims. (Cl. 260—75)

A non-exclusive, irrevocable, royalty-free license in the invention herein described, throughout the world for all purposes of the United States Government, with the power to grant sublicenses for such purposes, is hereby granted to the Government of the United States of America.

This invention relates to intumescent, surface protective coating compositions and in particular to the methods and to the specific ingredients used for preparing these coating compositions.

It is an object of this invention to provide protective coating compositions that in addition to being fire retardant are capable of withstanding durably the exposure to the elements, that is requisite for the use of protective coatings as exterior paints.

The fire-retardant, surface coatings that are the ultimate products of this invention can be applied to surfaces that are inherently flammable such as paper, cardboard, wood, fibrous wall board and the like as well as to non-flammable surfaces such as metal, plasterboard, and the like.

It is another object of this invention to prepare certain new and unique chemical compounds, the polyesters of aliphatic diyne-diol compounds with dibasic acids all of which compounds exhibit highly efficient intumescing properties under the influence of heat. Such materials are particularly valuable ingredients in fire-retardant protective coating compositions.

The problem of formulating fire-retardant, surface protective coatings is old and many solutions have been proposed and employed. One obvious method is to substitute non-flammable materials for the combustible ingredients in the surface coating composition and to obtain thereby some semblance of fire protection for the coated surface. This method has been widely practiced.

The use of certain groups of chemicals, such as the borates, the phosphates, and the silicates in solution to coat and thereby to protect wooden surfaces against fire is old. The effects of such treatments are at best transient since they provide no physical barrier between the surface being protected and the flame.

Old also is the use of thick non-flammable coatings made from materials, such as clay and gypsum. These materials although they afford a physical barrier and hence protect the surface somewhat better than the first mentioned surface treatments suffer the serious defect of being easily leached. Lack of water resistance precludes the use of these methods for providing protection on exterior surfaces.

The addition to the protective coating composition of certain materials that, when heated, will liberate copious quantities of non-combustible gases and thereby smother the flame and the addition of ingredients in a surface coating composition that will melt and form a glass-like non-flammable protective barrier under the influence of heat are still other approaches to the production of fire-retardant, surface protective coatings.

The best current method for producing a fire-retardant, surface protective coating is to incorporate within the coating composition a material or materials that, when heated, will liberate a considerable quantity of gas, which latter (gas) will cause the film of the coating composition to swell, forming a non-combustible, insulating barrier over the coated surface. This isolates the fire-vulnerable surface from flame by a fire-resisting, heat-insulating barrier. It is to this method of producing fire-retardant surface protective coatings that the instant invention is directed.

Numerous materials that intumesce under the influence of heat are well known to the art of formulating fire-retardant coating compositions. Many are natural products such as isano oil, gum tragacanth, gum arabic, Irish moss, and starch. The gas-producing ability and hence the intumescing efficiency of these known materials is quite indifferent when contrasted with that of the diyne-diol and butynediol polyesters, and the water-saturated, synthetic zeolites that are subjects of this invention. Moreover, whereas the known and heretofore employed intumescent materials are utilized as simple additives incorporated by mechanical mixing into the surface protective coating, the new polyester materials of this invention are, if desired, capable of being incorporated into the surface coating composition by chemical reactions.

As will be shown, the specific intumescent materials of this invention whether admixed or chemically bonded within the coating composition are not only superior to conventional intumescing materials by a factor of several hundred percent, but of more importance, they permit the preparation of protective coating compositions that can be pigmented and protective coating compositions that possess sufficient inherent stability to water, extremes of temperature, and exposure to sunlight so that the coatings may be employed as exterior paints. This latter feature makes the surface protective coatings prepared in accordance with this invention singular in the field of fire-retardant coatings of the intumescent type.

We have discovered that compounds represented by the formulas

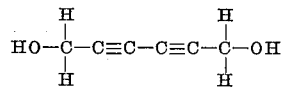

and

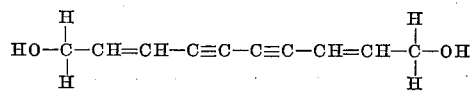

which are conjugated diacetylene diols wherein the hydroxyl groups are primary groups and wherein the hydroxyl groups are located in a position alpha to the conjugated unsaturation in the molecule and compounds which are the polyesters of these compounds with various dibasic acids are highly efficient gas-producing materials when subjected to heating at decomposition temperatures. These particular types of materials we will refer to hereinafter throughout the specification and the claims as "diyne-diol compounds" and "polyesters."

The conjugated diyne-diol compounds when esterified with dibasic acids, such as oxalic, maleic, succinic, adipic, butynedioic or sebacic acid, to form the respective polyesters quite unexpectedly exhibit enhanced gas-producing properties to the extent that the gas-producing propensities of the polyesters are clearly the result of a synergistic action between the dibasic acid and the diyne-diol compound.

The diyne-diol compounds of this invention which are useful for preparing the aforementioned polyesters are made by an oxidative coupling reaction. For example, propargyl alcohol (2-propyn-1-ol) is subjected to an oxidative coupling reaction to yield 2,4-hexadiyne-1,6-diol according to the following reaction scheme:

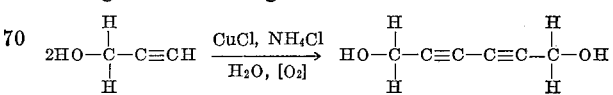

Similarly, pent-2-en-4-yn-1-ol is coupled to produce 2,8-decadiene-4,6-diyne-1,10-diol.

The oxidative coupling reaction used for preparing the diyne-diols of this invention is essentially as described by Armitage et al., J. Chem. Soc., 1952, pp. 1998–2005. The coupling reactions were carried out at room temperature in a slightly acidic water solution using cuprous chloride as a catalyst. Oxygen at atmospheric pressure was added from a measuring burette. Termination of gas absorption was used as the indicator for reaction completion.

These diyne-diol compounds and the related polyesters when subjected to heat decompose vigorously with the evolution of heat and gases.

The diyne-diols and the related polyesters were subjected to thermal decomposition tests (100–300° C.) in which a mercury filled gas burette was used to determine the volumes of gas evolved. The volumes, after correction to standard conditions of temperature and pressure, of typical tests follow.

The first named compound (2,4-hexadiyne-1,6-diol) will evolve on thermal decomposition about 150 milliliters of gas, measured at standard temperature and pressure, per gram of material. The second named compound (2,8-decadiene-4,6-diyne-1,10-diol) will evolve about 200 milliliters of gas, measured under standard temperature and pressure, per gram of material. The same diyne-diol compounds converted to polyesters via esterification reactions with maleic anhydride, for example, will evolve 350 milliliters of gas, measured under standard temperature and pressure, per gram of polyester material. The above recited volumes of gas when compared indicate the remarkable increase in gas-producing properties that attend the transformation of the diyne-diol compounds to polyesters. In addition, the esterification reactions render the diyne-diols water insoluble. In contrast a natural product, isano oil, used in the formulation of conventional intumescent paints, evolves only about 18 milliliters of gas, measured at standard temperature and pressure, per gram of material.

We have discovered that the most effective gas-producing compounds for our purpose are the diyne-diols wherein the OH groupings are alpha to the unsaturation. A diyne-diol wherein the OH groups are beta to the unsaturation, 3,5-octadiyne-1,8-diol for example, is no better as a gas producer upon thermal decomposition than is isano oil.

We have discovered additionally that it is important for the hydroxyl groups of the diyne-diol compounds to be primary hydroxyl groups. A disecondary diyne-diol compound, 3,5-octadiyne-2,7-diol, was prepared according to the oxidative coupling procedure but gas evolution from this compound upon thermal decomposition was very poor indeed, amounting to only about 33 milliliters of gas, measured under standard conditions of temperature and pressure, per gram of material. Similarly 1 gram of 2,7-dimethyl-3,5-octadiyne-2,7-diol yielded 3.0 ml. of gas and 1 gram of 3,8-dimethyl-4,6-decadiyne-3,8-diol yielded 6.1 ml. of gas.

Additionally, we have discovered that combining the aforementioned synthetic zeolites which have been saturated with water in the undercoat paint formulations described later herein is a particularly effective means of producing a gas-forming undercoat for use with a topcoat in multiple-formulation paint systems. These synthetic zeolites (alkali metal aluminosilicates) are especially useful in this invention since they are white, water-insoluble solids which adsorb appreciable quantities of water (about 1/5 of their weight) within the pores of their crystal lattices. Since the critical dimensions of the water molecule is around 3 Angstrom units, the synthetic zeolites used successfully in this invention have pore size diameters ranging from about 4 to about 13 Angstrom units, permitting water absorption in even the smallest void spaces of any of these materials. These unique properties of the water-saturated synthetic zeolites (known also as molecular sieves) allow their blending into undercoat formulations as gas-producing agents, which formulations possess stability to water, sunlight, extremes of temperature, and weathering so that they are well-suited for applications in multiple-formulation, exterior paint systems.

Thus, the diyne-diol and butynediol (i.e., 2-butyne-1,4-diol) polyesters and the water-saturated, synthetic zeolites of this invention were incorporated into the drying oil alkyds described later in this invention to produce gas-forming undercoats which when covered by a resistant topcoat gives multiple-formulation paint systems which achieve maximum benefits with respect to fire retardance. Superior fire-retardant performance is realized by multiple-formulation paint systems, in which the undercoat or undercoats contain the gas-producing entity and the topcoat is formulated to obtain some degree of thermal plasticity with respect to the dried film. This retains the gas evolved by the undercoat. Obviously, if the gas evolved as the result of exposure to heat is not retained by the dried protective coating film, the critical protective mat with its inherent insulating effect will not be achieved and the fire retardance of the coating film will as a consequence be poor. Since the diyne-diol polyesters are highly efficient gas producers we prefer to employ them in the multiple-formulation paint systems in which the undercoat is made from specially modified alkyds, such as a tung oil-linseed fatty acids-trimethylolethane-phthalic acid-epoxidized soybean oil alkyd, or other modified alkyds as described later herein, and containing from 1/8 % to 6% by weight of one of the gas-producing polyester components, and a topcoat which is made from a tung oil-linseed fatty acids-trimethylolethane-chlorendic acid-diisocyanate alkyd. Since the thermal decomposition of the polyesters results in a rapid evolution of gases and the different polyesters produce different volumes of gases, we prefer to use in this invention from 1/8 to 2% of the polyesters prepared from 2,4-hexadiyne-1,6-diol or 2,8-decadiene-4,6-diyne-1,10-diol with oxalic acid or maleic acid, from 1/4 to 4% of the polyesters prepared from 2,4-hexadiyne-1,6-diol or 2,8-decadiene-4,6-diyne-1,10-diol with succinic acid or adipic acid, from 1/2 to 6% of the polyesters prepared from 2,4-hexadiyne-1,6-diol or 2,8-decadiene-4,6-diyne-1,10-diol with sebacic acid or butynedioic acid, or from 1/8 to 6% of the polyesters prepared from 2-butyne-1,4-diol with oxalic acid or maleic acid, to prevent the evolution of too much gases which would rupture the paint film.

On the other hand, the concentration of the water-saturated, synthetic zeolites in the gas-producing undercoat paint formulations is not as critical since high temperatures cause the water-saturated synthetic zeolites to gradually evolve water-vapor gas. We have preferred to use in this invention from 1/2 to 5% of the gas-producing synthetic zeolite components in combination with the undercoat paint formulations illustrated. These gas-producing undercoat paint formulations are covered with a gas- and weather-resistant topcoat as illustrated.

Also, we have found that similarly prepared paint formulations which comprised from 1/2 % to 3% of certain other gas-producing materials, such as cupric carbonate, ferrous oxalate or manganous oxalate, are likewise effective means of producing gas-forming undercoat paint formulations which are operable within the scope of the multiple-formulation paint systems described herein.

Painted test panels prepared in this manner when exposed on a 45°-south weathering rack for about fourteen months did not lose any of their initial intumescing fire-retardant qualities.

EXAMPLE 1

*Preparation of 2,4-hexadiyne-1,6-diol*

The oxidative coupling reaction of 2,4-hexadiyne-1,6-diol was carried out in an aqueous reaction mixture consisting of 56 grams (1 mole) of 2-propyn-1-ol (propargyl alcohol), 230 grams (4.3 moles) of NH₄Cl, 148.5 grams (1.5 moles of CuCl and 600 milliliters of water. The aqueous solution was adjusted to ph 6.5. The reaction mixture was kept thoroughly agitated at room temperature and oxygen was added under slight pressure to the reaction mixture from a gas burette. The reaction was considered complete when the mixture ceased to absorb oxygen. The entire reaction mixture was extracted with 1800 milliliters of ether, the extract stripped under vacuum to remove the ether and unreacted propargyl alcohol and the extracted reaction mixture finally crystallized from benzene. The yield was 51 grams (about 93%).

The diyne-diol, 2,8-decadiene-4,6-diyne-1,10-diol, was prepared in the same manner using pent-2-en-4-yn-1-ol as the starting material.

EXAMPLE 2

Preparation of the polyesters 12.1 grams (0.11 mole) of 2,4-hexadiyne-1,6-diol, 0.1 mole of dibasic acid, 2-5% of p-toluenesulfonic acid (weight percent based on total solids) and sufficient benzene to produce a 20% solution was added to a 500-milliliter flask equipped with a stirrer, reflux condenser and a moisture trap. The reaction mixture was heated at reflux until the thereotical amount of water was collected in the moisture trap. The polyesters were insoluble in benzene solvent, thus the benzene was mechanically separated from the reaction mixture and the remaining traces of benzene were removed under vacuum. The above described procedure was carried out using oxalic acid, succinic acid, adipic acid, sebacic acid, maleic acid, butynedioic acid, and o-phthalic acid. Each of the dibasic acids except phthalic acid when incorporated with the diyne-diol compounds to produce a polyester imparted marked synergistic activity insofar as gas evolution upon thermal decomposition was concerned.

The polyester of 2,8-decadiene-4,6-diyne-1,10-diol and oxalic acid, maleic acid, succinic acid, adipic acid, sebacic acid, or butynedioic acid was prepared in a similar manner.

The polyester of 2-butyne-1,4-diol with oxalic or maleic acid was prepared in a similar manner.

The following is a description of the preparation of the alkyds we prefer for use with the diyne-diol, dienediyne-diol or butyne-diol polyesters or water-saturated synthetic zeolites of this invention:

EXAMPLE 3

Preparation of tung oil alkyds

The procedure employed to prepare the various types of tung oil alkyds is essentially as described by Leo A. Goldblatt, Lucien L. Hopper, Jr., and Eric T. Rayner, U.S. Patent Nos. 2,999,104 and 3,008,910.

(1) The tung oil, tung oil-cottonseed oil, or tung oil-dehydrated castor oil and 50% of the trimethylolethane were alcoholized and gasproofed in the presence of 0.03% litharge at 300° C. for 8 minutes. (2) The temperature of the mixture was reduced to 280° C., then the linseed fatty acids, the other 50% of the trimethylolethane, and 2% triphenyl phosphite were added. This mixture was esterified at about 250° C. until 80-90% of the theoretical amount of water of esterification was evolved. (3) Depending upon the bibasic acid used, the procedure was varied as follows: (a) When isophthalic acid was used, the temperature of the mixture was reduced to 180° C.; then the isophthalic acid was added. The mixture was esterified at about 230° C. until practically all the water of esterification was removed (acid value of about 9). (b) When phthalic anhydride was used, the temperature of the mixture was reduced to 180° C., then the anhydride and a few milliliters of benzene were added, the latter to remove the water of esterification azeotropically and to prevent the phthalic anhydride from subliming. This mixture was esterified between 200° and 250° C. until most of the water of esterification was removed azeotropically (acid value of about 20). (c) When chlorendic (1,4,5,6,7,7-hexachlorobicyclo-(2.2.1)-5-heptene-2,3-dicarboxylic) acid was used, the temperature of the mixing was reduced to 150° C.; then the chlorendic acid and several milliliters of benzene were added. The mixture was esterified at about 180° C. under reflux until practically all of the water of esterification was removed azeotropically (acid value of about 6). (d) When dimerized linoleic acid was used, the temperature of the mixture was reduced to 160° C.; then the dimerized linoleic acid and several milliliters of benzene was added. The mixture was esterified at about 220° C. under reflux until practically all of the water of esterification was removed azeotropically (acid value of about 8). (4) When epoxidized soybean oil was used, the temperature of the mixture in (3b) was reduced to 120° C. after the acid value of the mixture was reduced to about 20; then the epoxidized soybean oil was added and the temperature was kept at about 120° C. until the acid value was reduced to about 10 (usually took about 4 hours at 120° C.). (5) When either tolylene diisocyanate or trichlorophenyl diisocyanate was used, the temperature was reduced to about 100° C.; then the alkyd was diluted to about 70% solids with mineral spirits. The respective diisocyanate and 0.01% diethylethanolamine catalyst were added and the mixture was heated between 110° and 120° C. for 2 hours. Several milliliters of absolute ethanol was added after standing overnight to prevent excessive crosslinking upon aging.

Several dozen alkyds were prepared by the procedures described above, and evaluated with gas-producing components. The formulations are long, long oil alkyds which are thought to be particularly essential to impart plasticity and softness, and to minimize brittleness so that the gases evolved from the gas-producing components in the intumescing paint film will be confined and retained by the vehicle, the whole mass becoming the protective insulating barrier. Of these, the drying oil modified alkyds which can be employed most advantageously to prepare gas-producing undercoats with the gas-producing materials of this invention are shown below:

(a)

| | |
|---|---|
| Tung oil | 100 |
| Linseed oil fatty acids | 100 |
| Trimethylolethane | 35 |
| Phthalic anhydride | 33 |
| Epoxidized soybean oil (90%) | 25 |

(b)

| | |
|---|---|
| Tung oil | 100 |
| Linseed oil fatty acids | 100 |
| Trimethylolethane | 35 |
| Isophthalic acid | 19 |
| Tolylene diisocyanate | 19 |

(c)

| | |
|---|---|
| Tung oil | 100 |
| Linseed oil fatty acids | 100 |
| Trimethylolethane | 35 |
| Dimerized linoleic acid | 67 |
| Tolylene diisocyanate | 19 |

(d)

| | |
|---|---|
| Cottonseed oil | 50 |
| Tung oil | 50 |
| Linseed oil fatty acids | 100 |
| Trimethylolethane | 35 |
| Chlorendic (1,4,5,6,7,7-hexachlorobicyclo-(2.2.1)-5-heptene-2,3-dicarboxylic) acid | 43 |
| Tolylene diisocyanate | 19 |

(e)

| | |
|---|---|
| Dehydrated castor oil | 50 |
| Tung oil | 50 |
| Linseed oil fatty acids | 100 |
| Trimethylolethane | 35 |
| Chlorendic acid | 43 |
| Tolylene diisocyanate | 19 |

These alkyds, the gas-producing components, pigments, and other paint ingredients can be formulated into gas-producing paint formulations as illustrated below.

In these formulations, where reference is made to a "polyamide resin," the material used was a commercially available resin sold under the trade mark "Versamid 930," a polyamide of ethylenediamine and dimerized linoleic acid, as disclosed in Technical Bulletin 11-B-1 (1960) of the General Mills Chemical Division and produced in accordance with U.S. Patent No. 2,379,413. This resin has a maximum Gardner color of 12, a softening point of 105–115° C., a Brookfield viscosity of 21–27 poises at 160° C., and an amine value in the range of 1.4 to 7, as shown in Technical Bulletin 11-D-3 (1960) of the same manufacturer.

The synthetic zeolite referred to in the formulations resemble many natural clays and feldspars in that they are composed of soda, lime, alumina, and silica. These are commercially available in several types under the name, "Molecular Sieves." Type 5A, used in the present invention, has a pore opening of about 5 Angstroms in diameter; and for incorporation in the pigment component of the following formulations, was used as the fine crystalline powder, having a particle size from one-half to five microns, described in Technical Bulletin F-8614A (March 1956) of the Linde Air Products Company.

If desired, these formulations can be prepared without incorporation of the pigments listed to produce non-pigmented, gas-producing paint vehicles. Mineral spirits was added to these gas-producing paint vehicles or formulations as needed to adjust their final viscosity within a range of about 80 to 100 Krebs units, but we prefer to employ them for this invention at about 90 Krebs units viscosity.

As will be recognized by those skilled in the art, coating thickness and ease of spreading (brushability) are the use factors related to viscosity and for the purposes of the instant invention final viscosities of about 90 Krebs units are best.

FORMULATION A

|  | Percent Pigment | Percent of Total Paint |
|---|---|---|
| Pigment and other Solid Components: |  |  |
| Titanium Dioxide | 11.87 | 7.48 |
| Zinc Borate | 35.00 | 22.06 |
| Magnesium Silicate | 1.75 | 1.10 |
| Lead Sulfate | 19.95 | 12.57 |
| Lead Carbonate | 19.95 | 12.57 |
| Zinc Oxide | 11.26 | 7.09 |
| Polyester of 2,4-hexadiyne-1,6-diol and maleic acid | 0.21 | 0.13 |
| Total Pigment and Other Solids | 100.00 | 63.00 |
|  | Percent Vehicle |  |
| Non-volatile Vehicle Components: [a] |  |  |
| Alkyd "a" [b] | 35.14 | 13.00 |
| Refined Linseed Oil | 35.14 | 13.00 |
| Chlorinated Paraffin, 70% | 15.48 | 5.73 |
| Polyamide Resin (polyamide of ethylenediamine and linoleic dimer) [c] | 12.98 | 4.80 |
| Cobalt Naphthenate Solution (6% Cobalt as Metal) | 0.13 | 0.05 |
| Lead Naphthenate Solution (24% Lead as Metal) | 0.59 | 0.22 |
| Anti-Skinning Agent (National ASA) | 0.27 | 0.10 |
| Ultra Violet Screening Agent (UVINUL #490) [d] | 0.27 | 0.10 |
| Total Non-volatile Vehicle | 100.00 | 37.00 |
| Total Paint Non-volatiles |  | 100.00 |

[a] Mineral spirits was added to adjust final paint viscosity to about 90 Krebs Units.
[b] Alkyd was added as a mineral spirits solution of 50–80% solids content.
[c] Sixty-four grams of this resin was dissolved in 41 grams n-butanol by heating, then 75 grams of mineral spirits was added.
[d] A commercially available mixture of 2,2'-dihydroxy-4,4'-dimethoxybenzophenone and other tetra-substituted benzophenones sold under the trademark "Uvinul #490" by the General Aniline and Film Corporation (Technical Bulletin TS-35).

FORMULATION B

|  | Percent Pigment | Percent of Total Paint |
|---|---|---|
| Pigment and Other Solid Components: |  |  |
| Titanium Dioxide | 11.86 | 7.47 |
| Zinc Borate | 34.95 | 22.02 |
| Magnesium Silicate | 1.73 | 1.09 |
| Lead Sulfate | 19.92 | 12.55 |
| Lead Carbonate | 19.92 | 12.55 |
| Zinc Oxide | 11.22 | 7.07 |
| Polyester of 2,4-hexadiyne-1,6-diol and Maleic Acid | 0.40 | 0.25 |
| Total Pigment and Other Solids | 100.00 | 63.00 |
|  | Percent Vehicle |  |
| Non-volatile Vehicle Components: [a] |  |  |
| Alkyd "a" [b] | 35.14 | 13.00 |
| Refined Linseed Oil | 35.14 | 13.00 |
| Chlorinated Paraffin 70% | 15.48 | 5.73 |
| Polyamide Resin (polyamide of ethylene diamine and linoleic and dimer) [c] | 12.98 | 4.80 |
| Cobalt Naphthenate Solution (6% Cobalt as Metal) | 0.13 | 0.05 |
| Lead Naphthenate Solution (24% Lead as Metal) | 0.59 | 0.22 |
| Anti-Skinning Agent (National ASA) | 0.27 | 0.10 |
| Ultra Violet Screening Agent (UVINUL #490) | 0.27 | 0.10 |
| Total Non-volatile Vehicle | 100.00 | 37.00 |
| Total Paint Non-volatiles |  | 100.00 |

[a] Mineral spirits was added to adjust final paint viscosity to about 90 Krebs Units.
[b] Alkyd was added as a mineral spirits solution of 50–80% solids content.
[c] Sixty-four grams of this resin was dissolved in 41 grams n-butanol by heating, then 74 grams of mineral spirits was added.

FORMULATION C

|  | Percent Pigment | Percent of Total Paint |
|---|---|---|
| Pigment and other Solid Components: |  |  |
| Titanium Dioxide | 11.70 | 6.55 |
| Zinc Borate | 34.47 | 19.30 |
| Magnesium Silicate | 1.71 | 0.96 |
| Lead Sulfate | 19.64 | 11.00 |
| Lead Carbonate | 19.64 | 11.00 |
| Zinc Oxide | 11.05 | 6.19 |
| Synthetic Zoelite, saturated with water | 1.79 | 1.00 |
| Total Pigment and Other Solids | 100.00 | 56.00 |
|  | Percent Vehicle |  |
| Non-volatile Vehicle Components: [a] |  |  |
| Alkyd "a" [b] | 37.50 | 16.50 |
| Refined Linseed Oil | 37.50 | 16.50 |
| Chlorinated Paraffin 70% | 12.73 | 5.60 |
| Polyamide Resin (polyamide of ethylenediamine and linoleic acid dimer) [c] | 9.76 | 4.29 |
| Cobalt Naphthenate Solution (6% Cobalt as Metal) | 0.36 | 0.16 |
| Lead Naphthenate Solution (24% Lead as Metal) | 1.47 | 0.65 |
| Anti-Skinning Agent (National ASA) | 0.34 | 0.15 |
| Ultra Violet Screening Agent (UVINUL #490) | 0.34 | 0.15 |
| Total Non-volatile Vehicle | 100.00 | 44.00 |
| Total Paint Non-volatiles |  | 100.00 |

[a] Mineral spirits was added to adjust final paint viscosity to about 90 Krebs Units.
[b] Alkyd was added as a mineral spirits solution of 50–80% solids content.
[c] Sixty-four grams of this resin was dissolved in 41 grams n-butanol by heating, then 75 grams of mineral spirits was added.

FORMULATION D

| | Percent Pigment | Percent of Total Paint |
|---|---|---|
| Pigment and other Solid Components: | | |
| Titanium Dioxide | 11.67 | 5.72 |
| Zinc Borate | 34.38 | 16.84 |
| Magnesium Silicate | 1.71 | 0.84 |
| Lead Sulfate | 19.59 | 9.60 |
| Lead Carbonate | 19.59 | 9.60 |
| Zinc oxide | 11.02 | 5.40 |
| Synthetic Zeolite saturated with water | 2.04 | 1.00 |
| Total Pigment and Other Solids | 100.00 | 49.00 |
| | Percent Vehicle | |
| Non-volatile Vehicle Components: [a] | | |
| Alkyd "a" [b] | 39.22 | 20.00 |
| Refined Linseed Oil | 39.22 | 20.00 |
| Chlorinated Paraffin 70% | 9.84 | 5.02 |
| Polyamide Resin (polyamide of ethylenediamine and linoleic acid dimer) [c] | 9.02 | 4.60 |
| Cobalt Naphthenate Solution (6% Cobalt as Metal) | 0.39 | 0.20 |
| Lead Naphthenate Solution (24% Lead as Metal) | 1.53 | 0.78 |
| Anti-Skinning Agent (National ASA) | 0.39 | 0.20 |
| Ultra Violet Screening Agent (UVINUL #490) | 0.39 | 0.20 |
| Total Non-volatile Vehicle | 100.00 | 51.00 |
| Total Paint Non-volatiles | | 100.00 |

[a] Mineral spirits was added to adjust final paint viscosity to about 90 Krebs units.
[b] Alkyd was added as a mineral spirits solution of 50–80% solids content.
[c] Sixty-four grams of this resin was dissolved in 41 grams n-butanol by heating, then 75 grams of mineral spirits was added.

FORMULATION E

| | Percent Pigment | Percent of Total Paint |
|---|---|---|
| Pigment and other Solid Components: | | |
| Titanium Dioxide | 11.90 | 7.50 |
| Zinc Borate | 35.08 | 22.10 |
| Magnesium Silicate | 1.75 | 1.10 |
| Lead Sulfate | 20.00 | 12.60 |
| Lead Carbonate | 20.00 | 12.60 |
| Zinc Oxide | 11.27 | 7.10 |
| Total Pigment and Others Solids | 100.00 | 63.00 |
| | Percent Vehicle | |
| Non-volatile Vehicle Components: [a] | | |
| Refined Linseed Oil | 70.27 | 26.00 |
| Chlorinated Paraffin 70% | 15.49 | 5.73 |
| Polyamide Resin (polyamide of ethylenediamine and linoleic acid dimer) [b] | 12.98 | 4.80 |
| Cobalt Naphthenate Solution (6% Cobalt as Metal) | 0.13 | 0.05 |
| Lead Naphthenate Solution (24% Lead as Metal) | 0.59 | 0.22 |
| Anti-Skinning Agent (National ASA) | 0.27 | 0.10 |
| Ultra Violet Screening Agent (UVINUL #490) | 0.27 | 0.10 |
| Total Non-volatile Vehicle | 100.00 | 37.00 |
| Total Paint Non-volatiles | | 100.00 |

[a] Mineral sprits was added to adjust final paint viscosity to about 90 Krebs Units.
[b] Sixty-four grams of this resin was dissolved in 41 grams n-butanol by heating, then 75 grams of mineral spirits was added.

FORMULATION F

| | Percent Pigment | Percent of Total Paint |
|---|---|---|
| Pigment and other Solid Components: | | |
| Titanium Dioxide | 11.90 | 7.50 |
| Zinc Borate | 35.08 | 22.10 |
| Magnesium Silicate | 1.75 | 1.10 |
| Lead Sulfate | 20.00 | 12.60 |
| Lead Carbonate | 20.00 | 12.60 |
| Zinc Oxide | 11.27 | 7.10 |
| Total Pigment and Other Solids | 100.00 | 63.00 |
| | Percent Vehicle | |
| Non-volatile Vehicle Components: [a] | | |
| Raw Isano Oil | 35.14 | 13.00 |
| Refined Linseed Oil | 35.14 | 13.00 |
| Chlorinated Paraffin 70% | 15.48 | 5.73 |
| Polyamide Resin (polyamide of ethylenediamine and linoleic acid dimer) [b] | 12.98 | 4.80 |
| Cobalt Naphthenate Solution (6% Cobalt as Metal) | 0.13 | 0.05 |
| Lead Naphthenate Solution (24% Lead as Metal) | 0.59 | 0.22 |
| Anti-Skinning Agent (National ASA) | 0.27 | 0.10 |
| Ultra Violet Screening Agent (UVINUL #490) | 0.27 | 0.10 |
| Total Non-volatile Vehicle | 100.00 | 37.00 |
| Total Paint Non-volatiles | | 100.00 |

[a] Mineral spirits was added to adjust final paint viscosity to about 90 Krebs Units.
[b] Sixty-four grams of this resin was dissolved in 41 grams n-butanol by heating, then 75 grams of mineral spirits was added.

Typical drying oil modified alkyds which can be employed advantageously to prepare resistant topcoats for these gas-producing undercoats are shown below:

(f)

| | |
|---|---|
| Tung oil | 100 |
| Linseed oil fatty acids | 100 |
| Trimethylolethane | 35 |
| Chlorendic acid | 43 |
| Tolylene diisocyanate | 19 |

(g)

| | |
|---|---|
| Tung oil | 100 |
| Linseed oil fatty acids | 100 |
| Trimethylolethane | 35 |
| Chlorendic acid | 43 |
| Trichlorophenyl diisocyanate | 29 |

These alkyds, pigments, and other paint ingredients can be formulated into weather- and gas-resistant, topcoat paint formulations as illustrated below:

FORMULATION G

| | Percent Pigment | Percent of Total Paint |
|---|---|---|
| Pigment and other Solid Components: | | |
| Titanium Dioxide | 11.90 | 7.50 |
| Zinc Borate | 35.08 | 22.10 |
| Magnesium Silicate | 1.75 | 1.10 |
| Lead Sulfate | 20.00 | 12.60 |
| Lead Carbonate | 20.00 | 12.60 |
| Zinc Oxide | 11.27 | 7.10 |
| Total Pigment and Other Solids | 100.00 | 63.00 |
| | Percent Vehicle | |
| Non-volatile Vehicle Components: [a] | | |
| Alkyd "f" [b] | 70.27 | 26.00 |
| Chlorinated Parafin 70% | 15.49 | 5.73 |
| Polyamide Resin (polyamide of ethylene diamine and linoleic acid dimer) [c] | 13.46 | 4.98 |
| Cobalt Naphthenate Solution (6% Cobalt as Metal) | 0.05 | 0.02 |
| Lead Naphthenate Solution (24% Lead as Metal) | 0.19 | 0.07 |
| Anti-Skinning Agent (National ASA) | 0.27 | 0.10 |
| Ultra Violet Screening Agent (UVINUL #490) | 0.27 | 0.10 |
| Total Non-volatile Vehicle | 100.00 | 37.00 |
| Total Paint Non-volatiles | | 100.00 |

[a] Mineral spirits was added to adjust final paint viscosity to about 90 Krebs Units.
[b] Alkyd was added as a mineral spirits solution of 50–80% solids content.
[c] Sixty-four grams of this resin was dissolved n 41 grams n-butanol bAi heating, then 75 grams of mineral ıdsrits was added.

Preparation of fire-retardant paint films

One or two coats (about 3 to 4 mils per coat) of the gas-producing undercoat paint formulations were spread with a brush on poplar heartwood panels (6 x 12 x ¼ inches). Then a coat of the weather- and gas-resistant topcoat paint formulation was applied. The different coats were applied about 24 hours apart. The procedure listed in Federal Specification TT-P-34a was followed as closely as possible. The total weight of paint on each panel was computed after the paint films had been cured for about 2 weeks, but the weight of the undercoat or undercoats was determined as soon as they were tack-free.

Evaluation of fire-retardant paint films

The cured paint films were evaluated according to Federal Specification TT-P-34a with a standard fire test cabinet (New York Paint and Varnish Production Club Test Cabinet). Some of the paint films were evaluated for their fire retardancy before leaching, some after leaching, and other after weathering for about 14 months. Numerous different types of intumescing fire-retardant paint formulations were developed and evaluated. The data obtained from representative examples is illustrated in Table I.

We claim:
1. A polyester prepared by refluxing, until the theoretical amount of water is produced, a mixture of substantially equimolar proportions of 2,4-hexadiyne-1,6-diol and a dibasic acid selected from the group consisting of oxalic, maleic, succinic, adipic, sebacic, and butynedioic acids.
2. The polyester of claim 1 wherein the dibasic acid is oxalic acid.
3. The polyester of claim 1 wherein the dibasic acid is maleic acid.
4. The polyester of claim 1 wherein the dibasic acid is succinic acid.
5. The polyester of claim 1 wherein the dibasic acid is adipic acid.
6. The polyester of claim 1 wherein the dibasic acid is sebacic acid.
7. The polyester of claim 1 wherein the dibasic acid is butynedioic acid.
8. A polyester prepared by refluxing, until the theoretical amount of water is produced, a mixture of substantially equimolar proportions of 2,8-decadiene-4,6-diyne-1,10-diol and a dibasic acid selected from the group consisting of oxalic, maleic, succinic, adipic, sebacic, and butynedioic acids.

TABLE I

[Evaluation of two- and three-coat paint films, prepared from single and multiple formulations for their fire retardancy before leaching, after leaching, and after weathering, according to Federal Specification TT-P-34a[a]]

| Paint Formulations | | Paint on panel | | | | Panel weight loss after fire retardancy evaluation | | |
|---|---|---|---|---|---|---|---|---|
| Undercoat | Topcoat | Undercoats | | Topcoat (gms.) | Total (gms.) | Nonleached (gms.) | Leached (gms.) | Weathered [b] (gms.) |
| | | 1st (gms.) | 2nd (gms.) | | | | | |
| A | G | 10.8 | 10.9 | ------ | 21.7 | 14.2 | ------ | ------ |
|   |   | 15.2 | ------ | 14.6 | 29.8 | 5.6 | ------ | ------ |
|   |   | 15.7 | ------ | 15.6 | 31.3 | ------ | 10.5 | ------ |
|   |   | 15.4 | ------ | 15.2 | 30.6 | ------ | ------ | 8.5 |
|   |   | 15.5 | 15.5 | 15.2 | 46.2 | 7.8 | ------ | ------ |
|   |   | 15.4 | 15.4 | 15.5 | 46.3 | ------ | 9.7 | ------ |
|   |   | 15.7 | 15.5 | 15.9 | 47.1 | ------ | ------ | 6.8 |
| B | G | 10.6 | 11.0 | ------ | 21.6 | 13.5 | ------ | ------ |
|   |   | 15.5 | ------ | 15.4 | 30.9 | 10.8 | ------ | ------ |
|   |   | 15.8 | ------ | 15.1 | 30.9 | ------ | 9.7 | ------ |
|   |   | 15.9 | ------ | 16.0 | 31.9 | ------ | ------ | 9.0 |
|   |   | 15.0 | 15.7 | 15.5 | 46.2 | 9.4 | ------ | ------ |
|   |   | 15.9 | 15.1 | 15.4 | 46.4 | ------ | 9.0 | ------ |
|   |   | 15.4 | 15.1 | 16.3 | 46.8 | ------ | ------ | 7.9 |
| C | G | 14.9 | 13.9 | ------ | 28.8 | 14.0 | ------ | ------ |
|   |   | 15.2 | ------ | 14.4 | 29.6 | 6.2 | ------ | ------ |
|   |   | 15.5 | ------ | 15.5 | 31.0 | ------ | 10.1 | ------ |
|   |   | 15.5 | ------ | 14.6 | 30.1 | ------ | ------ | 7.7 |
|   |   | 15.3 | 14.7 | 14.8 | 44.8 | 6.7 | ------ | ------ |
|   |   | 15.5 | 14.9 | 15.1 | 45.5 | ------ | 7.8 | ------ |
|   |   | 15.9 | 15.3 | 14.9 | 46.1 | ------ | ------ | 6.7 |
| D | G | 15.0 | 13.5 | 15.2 | 43.7 | 7.4 | ------ | ------ |
|   |   | 14.0 | 13.5 | 15.4 | 42.9 | ------ | 7.7 | ------ |
|   |   | 15.9 | 12.7 | 14.6 | 43.2 | ------ | ------ | 7.8 |
| E | None | 13.8 | 15.3 | ------ | 29.1 | 13.2 | ------ | ------ |
| F | G | 12.6 | 13.0 | ------ | 25.6 | 13.4 | ------ | ------ |
|   |   | 12.4 | ------ | 12.0 | 24.4 | 6.6 | ------ | ------ |
| H-1[c] | None | 13.6 | 14.8 | ------ | 28.4 | 9.6 | ------ | ------ |
|   |   | 14.6 | 14.2 | ------ | 29.0 | ------ | 13.5 | ------ |
|   |   | 14.6 | 13.9 | ------ | 28.5 | ------ | ------ | [d] 15.0 |
| H-2[e] | H-3[f] | 11.5 | 12.6 | 10.9 | 35.0 | 4.8 | ------ | ------ |
|   |   | 12.5 | 12.4 | 11.4 | 36.3 | ------ | 7.4 | ------ |
|   |   | 12.8 | 12.8 | 10.7 | 36.3 | ------ | ------ | [g] 13.4 |
| H-2[e] | G | 12.1 | 12.4 | 12.5 | 37.0 | 4.2 | ------ | ------ |
|   |   | 12.4 | 12.7 | 12.5 | 37.6 | ------ | 7.3 | ------ |
|   |   | 12.5 | 12.5 | 12.0 | 37.0 | ------ | ------ | 9.6 |
| H-2[e] | | 16.3 | 13.0 | ------ | 29.3 | 6.2 | ------ | ------ |
|   |   | 16.7 | 13.3 | ------ | 30.0 | ------ | 21.8 | ------ |
| H-4[h] | | 12.2 | 12.4 | ------ | 24.6 | 3.9 | ------ | ------ |
|   |   | 12.4 | 12.6 | ------ | 25.0 | ------ | 20.5 | ------ |

[a] Details of experimental procedure are given in Federal Specification TT-P-34a. These are average results obtained from duplicates or triplicates.
[b] These test specimens were exposed to natural weathering, facing South under 45°, for about 14 months in New Orleans.
[c] A commercial, exterior, intumescing fire-retardant paint formulation.
[d] The test specimen began to crack after several months exposure, followed by extensive cracking after 14 months.
[e] A commercial intumescing fire-retardant paint formulation.
[f] A commercial, exterior paint formulation employed as a resistant topcoat for paint formulation H-2.
[g] The test specimens were evaluated for their fire retardancy after only two months exposure because of extensive peeling and cracking.
[h] A commercial, interior, intumescing fire-retardant paint formulation.

9. The polyester of claim 8 wherein the dibasic acid is oxalic acid.

10. The polyester of claim 8 wherein the dibasic acid is maleic acid.

11. The polyester of claim 8 wherein the dibasic acid is succinic acid.

12. The polyester of claim 8 wherein the dibasic acid is adipic acid.

13. The polyester of claim 8 wherein the dibasic acid is sebacic acid.

14. The polyester of claim 8 wherein the dibasic acid is butynedioic acid.

15. The polyester prepared by refluxing a mixture of substantially equimolar proportions of 2-butyne-1,4-diol and oxalic acid until the theoretical amount of water is produced.

16. The polyester prepared by refluxing a mixture of substantially equimolar proportions of 2-butyne-1-4-diol and maleic acid until the theoretical amount of water is produced.

17. A polyester prepared by refluxing, until the theoretical amount of water is produced, a mixture of substantially equimolar proportions of a conjugated diyne-diol in which the hydroxyl groups are primary and a dibasic acid selected from the group consisting of oxalic, maleic, succinic, adipic, sebacic, and butynedioic acids.

References Cited by the Examiner

UNITED STATES PATENTS

| | | | |
|---|---|---|---|
| 2,282,827 | 5/1942 | Rothrock | 260—75 X |
| 2,420,644 | 5/1947 | Athy et al. | |
| 2,754,217 | 7/1956 | Allen et al. | |
| 2,901,516 | 8/1959 | Wynn | 260—410.6 X |
| 2,942,014 | 6/1960 | Cameron | 260—410.6 |
| 2,952,630 | 9/1960 | Eggertsen et al. | 208—46 |
| 2,999,104 | 9/1961 | Goldblatt et al. | 260—410.6 |
| 3,008,910 | 11/1961 | Goldblatt et al. | 260—410.6 |
| 3,050,480 | 8/1962 | Budde | 260—22 |
| 3,090,764 | 5/1963 | Ellis et al. | 260—28.5 |

FOREIGN PATENTS

| | | |
|---|---|---|
| 209,732 | 8/1955 | Australia. |
| 948,086 | 8/1956 | Germany. |

OTHER REFERENCES

"Synthesis and Study of Triple Bond Polyesters, Polycondensation of Acetylenic Glycols With Dicarboxylic Acids," A. M. Sladkow et al., Vysokomolekul Soedin; 6: 8; pp. 1398–1402; 1964. (Copy available in NRL Library; see C.A. 61: 16168(b).)

Heintz et al.: Chem. Abstracts, volume 52, 1958, page 19179e. (Copy in Scientific Library.)

LEON J. BERCOVITZ, *Primary Examiner.*

R. W. GRIFFIN, C. W. IVY, *Assistant Examiners.*